United States Patent Office 2,956,920
Patented Oct. 18, 1960

2,956,920

DICHLORO VINYL PHOSPHONIC ACID ESTERS

Werner Perkow, Hamburg, Germany, assignor to Norddeutsche Affinerie, Hamburg, and Firma C. F. Spiess and Sohn, Kleinkarlbach, Rheinpfalz, Germany No Drawing. Filed Dec. 29, 1958, Ser. No. 783,208

Claims priority, application Germany Sept. 16, 1958

4 Claims. (Cl. 167—22)

The present invention relates to novel O,O-dialkyl-1-acyloxy-phosphonic acid ester insecticidal compounds of the general formula

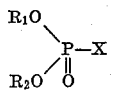

in which $R_1$ and $R_2$ represent the same or different alkyl radicals containing from 1 to 5 carbon atoms and X is a radical selected from the group consisting of

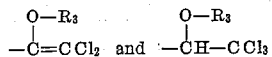

wherein $R_3$ is an acyl radical of aliphatic or aromatic carboxylic acids, such as acetyl, propionyl, isovaleryl, chloroacetyl, trichloroacetyl, benzoyl and p-chlorobenzoyl radicals and to insecticidal compositions containing such compounds as the active ingredient.

It is known that the reaction products of conversions of phosphorous acid dialkyl esters with α halogenated aldehydes or ketones possess insecticidal action. These compounds have been ascribed the formula of O,O-dialkyl-1-hydroxy-alkyl-phosphonic acid esters and it was found that they are transformed with splitting off of HCl and with molecular rearrangement into esters of orthophosphoric acid in an alkaline medium or in the presence of catalysts. The best known and often described example of such a rearrangement is that of O,O-dimethyl-1-hydroxy-2,2,2-trichloroethyl phosphonic acid ester (I) (obtainable from dimethyl phosphite and chloral) into O,O-dimethyl-O-2,2-dichlorovinyl phosphoric acid ester (II) according to the folowing equation:

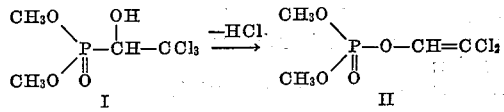

Both compounds I and II have insecticidal properties, but from a toxicological point of view a very significant difference, in that the hydroxy phosphonic acid ester I has a very low toxicity for warm blooded animals chaarcterized by a $LD_{50}$ of about 450 mg./kg. when administered orally to rats, whereas the vinyl phosphate II which has a $LD_{50}$ of about 40–50 mg./kg. is a strongly poisonous substance, the use of which is dangerous. As a consequence when use is made of the relatively toxicologically harmless 2-halogenated hydroxy phosphonic esters of the type of Formula I there is always the danger of conversion to the considerably more toxic phosphoric acid esters of the type of Formula II when they are contacted with an alkaline medium, such as lime, or catalysts, such as iron salts, which promote splitting off of HCl.

According to the invention it was unexpectedly found that this difficulty can be avoided when the hydroxy group of 2-halogenated hydroxy phosphonic acid esters is acylated by example by reaction with carboxylic acid anhydrides to form the corresponding acyloxy phosphonic acid ester. These acylated derivatives are also effective insecticides against a large variety of insects, but on the other hand are of low toxicity against warm blooded animals. The acylated derivatives are also capable of splitting off HCl, but without rearrangement of the phosphonic ester form so that even on such splitting off of HCl the low toxicity against warm blooded animals is retained. This reaction is exemplified by the splitting off of HCl from O,O-dimethyl-1-acetoxy-2,2,2-trichloroethyl - phosphonic acid ester (III, B.P. 1 mm. Hg=142–144° C.) with the formation of O,O-dimethyl-1-acetoxy-2,2 - dichlorovinyl-phosphonic acid ester (IV, B.P. 1 mm. Hg=130–132° C.) according to the following equation:

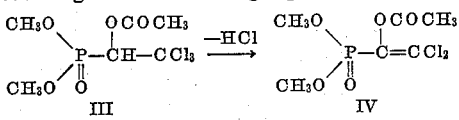

The spliting off of HCl can be effected during the process of preparation of the compounds by alkaline agents or gradually or partially in the ready mixture of the active compounds by addition of acid acceptors.

Both compounds III and IV are effective insecticides but are rather harmless when used under the usual conditions as their $LD_{50}$ is about 400 mg./kg. mouse administered intraperitoneally. The insecticidal activity of compound IV is greater than that of compound III from which it is derived and in some instances it was found that a mixture of the two compounds, that is, a "semi-saponified" product, is especially suited. In some instances, for example, when the acyl radical is derived from trichloroacetic acid, chloroacetic acid, benzoic acid or substituted benzoic acids, a lesser or greater proportion of a compound of type IV is produced alongside of the compound of type III during the preparation of compounds of type III, by acylation of the hydroxy phosphonic acid ester, because of automatic splitting off of HCl during process of the products, for example, on heating, even in the absence of an alkaline medium.

Examples of compounds of the type

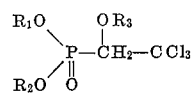

are

| $R_1$ | $R_2$ | $R_3$ | Boiling point, ° C. | Density $D^{20}$ |
|---|---|---|---|---|
| $CH_3$ | $CH_3$ | $COCH_3$ | 140–142°/1 mm./Hg | |
| $CH_3$ | $CH_3$ | $COC_2H_5$ | 141–143°/1 mm./Hg | |
| $CH_3$ | $CH_3$ | $COC_4H_9$ (-isovaleryl) | 156–159°/2.5 mm./Hg | |
| $C_2H_5$ | $C_2H_5$ | $COCH_3$ | 125–130°/2.5 mm./Hg | |
| i-$C_3H_7$ | $C_3H_7$ | $COCH_3$ | decomposed | 1.290 |

Examples of compounds of the type

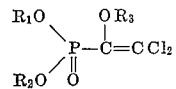

are

| $R_1$ | $R_2$ | $R_3$ | Boiling Point, ° C. | Density $D^{20}$ |
|---|---|---|---|---|
| $CH_3$ | $CH_3$ | $COCH_3$ | 128–131°/1 mm./Hg | |
| $CH_3$ | $CH_3$ | $COC_2H_5$ | 114–117°/0.2 mm./Hg | |
| $CH_3$ | $CH_3$ | $COC_4H_9$ (-isovaleryl) | decomposed | 1.202 |
| $CH_3$ | $CH_3$ | $COC_6H_5$ | do | 1.329 |
| $CH_3$ | $CH_3$ | $COCH_2Cl$ | do | 1.528 |
| $C_2H_5$ | $C_2H_5$ | $COC_2H_5$ | do | 1.202 |

Insecticidal compositions can be prepared from the novel compounds according to the invention by admixture with diluents, carriers, propelling agents, emulsifiers, wetting agents or other adjuvants or be mixed with other pesticidal compositions of, for example, insecticidal, acaricidal or fungicidal nature, depending upon the purpose for which they are to be used. Because of their low toxicity they are especially suited for combatting flies and other hygienic pests in dwelling rooms, storage bins and barns. The compounds have also been found to have high activity against insect strains which have become resistant to halogenated hydrocarbons.

The following examples will serve to illustrate several embodiments of compounds according to the invention and their effectiveness as insecticides.

Example 1

25.8 g. of O,O-dimethyl-1-hydroxy-2,2,2-trichloroethyl phosphonic acid ester (M.P. 70° C.) which was obtained in a known manner by mixing equimolecular proportions of dimethyl phosphite and chloral, were dissolved with slight heating in 11 g. of acetic acid anhydride and the solution permitted to stand over night at room temperature. Thereupon 6 g. of the acetic acid produced were distilled off under vacuum and 29 g. of a light yellow oil were obtained which could be distilled at 128–131° C. under 1 mm. Hg pressure. Analysis of the composition showed it to be $C_6H_{10}O_5PCl_3$ which corresponds to the formula of O,O-dimethyl-1-acetoxy-2,2,2-trichloroethyl phosphonic acid ester, $$(CH_3O)_2P(O)CH(OCOCH_3)CCl_3$$

3 g. of this compound were homogeneously mixed with 97 g. of talcum powder and the mixture sieved. Petri dishes were uniformly dusted with the mixture in a quantity corresponding to an application rate of 10 kg./ hektare, that is, about 6 mg. When grain weevils (*Calandra granaria*) were placed in these dishes they were irreversibly severely injured after about 3 hours and killed after 6 hours. A corresponding activity was observed when grain infested with grain weevils was uniformly mixed with 1 g. of the dust per kilo of grain.

Example 2

29 g. of the crude O,O-dimethyl-1-acetoxy-2,2,2-trichloroethyl phosphonic acid ester produced according to Example 1 were dissolved in 150 cc. of dry benzene and after adding 7.5 g. of finely powdered water free sodium carbonate the mixture was heated to boiling under reflux for 2 hours with strong stirring. After the mixture cooled down the inorganic salts were filtered off on a suction filter and the solvent distilled off from the filtrate under reduced pressure. 23.5 g. of a light yellow oil having a boiling point of 128–131° C. under 1 mm. Hg pressure remained as the residue. The analytical composition thereof was $C_6H_9O_5PCl_2$ which corresponded to the formula of O,O-dimethyl-1-acetoxy-2,2-dichlorovinyl phosphonic acid ester, $(CH_3O)_2P(O)C(OCOCH_3)CCl_2$. 1.5 g. of this compound were dissolved in a liquid mixture of 75 cc. of vinyl chloride and 20 cc. of propane-butane at −35° C. and placed in an aerosol bomb. The aerosol fog produced therewith was lethal within a few minutes to *Musca domestica, Culex pipens*, Calliphora spec., *Blatta orientalis, Tinea granella, Ephestia elutella* and other pests.

Example 3

2 cc. of an 0.02% solution of O,O-dimethyl-1-acetoxy-2,2,2-trichloroethyl phosphonic acid ester, prepared analogously to the O,O-dimethyl compound of Example 1, in acetone were applied to a round filter paper 9 cm. in diameter and the solvent permitted to evaporate. The filter paper was then placed in a Petri dish together with vinegar flies (*Drosophila melanogaster*). The flies died within a few minutes.

Example 4

10 g. of O,O-diethyl-1-acetoxy-2,2-dichlorovinyl phosphonic acid ester prepared analogously to the vinyl ester of Example 2 were mixed with 5 g. of xylene and 5 g. of a non-ionic surface active agent of the type of polyglycols of higher alcohols, such as, for example, lauryl hexa ethylene glycol ether. This mixture could be easily dispersed in water. When turnip leaves which were infested with worms of *Plitella maculipennis* were sprayed with a 0.1% aqueous suspension of this mixture, the worms fell off the leaves within the first hour and died after a few more hours.

Example 5

25.8 g. of O,O-dimethyl-1-hydroxy-2,2,2-trichloroethyl phosphonic acid ester were dissolved in 150 cc. of dry benzene and 13.5 g. of propionic acid anhydride and 1 drop of concentrated sulfuric acid were added to such solution. The mixture after standing over night at room temperature contained almost the calculated quantity, $\frac{1}{10}$ mol, of O,O-dimethyl-1-propoxy-2,2,2-trichloroethyl phosphonic acid ester (B.P. 141–143° C. at 1 mm. Hg) and $\frac{1}{10}$ mol propionic acid. In this instance the compounds were not isolated and 15 g. of finely powdered water free potassium carbonate were added to the benzene solution. The mixture was then refluxed for 2 hours while stirring. After the mixture had cooled off the salts were filtered off and the solvent distilled off under reduced pressure. 24 g. of residue remained in the form of a light yellow oil having a boiling point of 114–117° C. at 0.2 mm. Hg pressure. The analytic composition thereof was $C_7H_{11}O_5PCl_2$ which corresponded to the formula of O,O-dimethyl-1-propoxy-2,2-dichlorovinyl phosphonic acid ester. 2 parts by weight of such vinyl phosphonic acid ester were intimately mixed with 2.5 parts of dichlorodiphenyltrichloroethane, 1 part of octylphenyldecaethyleneglycol ether, 2 parts of carboxymethylcellulose and 92.5 parts of chalk and the mixture ground. The resulting mixture was stirred together with double the weight of water to produce a thick liquid suspension and such suspension painted on the walls and ceilings of barns and of rooms in dwellings. Continued control of flies and mosquitoes, as well as other insects, was thereby attained over a period of months.

Example 6

O,O-dimethyl - chloroacetoxy-2,2-dichlorovinyl - phosphonic acid ester was prepared according to the procedure of Example 5 using 17.1 g. of chloroacetic acid anhydride instead of the propionic acid anhydride. A 0.1% solution of such compound in acetone was prepared and a thin coating thereof sprayed on the bottom of a Petri dish. After the solvent had evaporated flies (*Musca domestica*) were introduced into the Petri dish. The flies died after about 10 minutes.

I claim:

1. A compound of the general formula

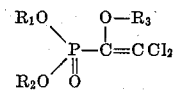

wherein $R_1$ and $R_2$ are alkyl radicals containing from 1 to 5 carbon atoms and $R_3$ is an acyl radical of a carboxylic acid selected from the group consisting of lower alkanoic acids, chloro substituted lower alkanoic acids, benzoic acid and p-chloro benzoic acid.

2. O,O - dimethyl - 1 - acetoxy - 2,2 - dichlorovinyl phosphonic acid ester.

3. An insecticidal composition comprising an insecticidal adjuvant as an inert carrier and as the essential active insecticidal ingredient a compound of the general formula

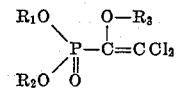

wherein $R_1$ and $R_2$ are alkyl radicals containing from 1 to 5 carbon atoms and $R_3$ is an acyl radical of a carboxylic acid selected from the group consisting of lower alkanoic acids, chloro substituted lower alkyl alkanoic acids, benzoic acid and p-chloro benzoic acid.

4. An insecticidal composition comprising an insecticidal adjuvant as an inert carrier and O,O-dimethyl-1-acetoxy-2,2-dichlorovinyl phosphonic acid ester as the essential active insecticidal ingredient.

References Cited in the file of this patent

Casida: "J. Agr. Food Chem.," 4, 776, 778 (September 1956).

Arthur et al.: "J. Agr. Food Chem.," 5, 186–192 (March 1957).

McConnell et al.: "J. Org. Chem.," 23, 830–834 (June 1958).